(12) United States Patent
Kohno

(10) Patent No.: US 6,694,095 B2
(45) Date of Patent: Feb. 17, 2004

(54) MOTOR DRIVING APPARATUS

(75) Inventor: Takanori Kohno, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/460,356

(22) Filed: Jun. 13, 2003

(65) Prior Publication Data

US 2003/0231879 A1 Dec. 18, 2003

(30) Foreign Application Priority Data

Jun. 14, 2002 (JP) ........................................ 2002-173475

(51) Int. Cl.⁷ .............................................. G03B 17/00
(52) U.S. Cl. ........................... 396/48; 396/85; 396/133; 396/463; 396/508; 396/79; 348/240.3; 348/345; 348/362; 318/34; 318/54; 318/625
(58) Field of Search .......................... 396/85, 48, 133, 396/463, 508, 79–83; 348/240.3, 345, 362; 318/4, 5, 625, 34, 54, 65

(56) References Cited

U.S. PATENT DOCUMENTS 4,288,726 A * 9/1981 Vazquez-Cuervo et al. ... 318/54
4,774,441 A * 9/1988 Toyomasu et al. .......... 318/102
4,855,778 A * 8/1989 Ishimura et al. ............... 396/48

FOREIGN PATENT DOCUMENTS

JP  2002-357858  12/2002
JP  2002-359998  12/2002
JP  2002-365703  12/2002

* cited by examiner

Primary Examiner—W. B. Perkey
(74) Attorney, Agent, or Firm—Nixon Peabody, LLP (57) ABSTRACT

A motor driving apparatus is basically composed of a driving circuit for driving a plurality of loads contained in a plurality of motors, and a control circuit for controlling the driving circuit to sequentially drive the plurality of the motors. The driving circuit has at least two channels which are controlled by the control circuit concurrently with each other. Each channel is controlled by the control circuit such as to selectively drive the loads. The channel is provided with at least (n+1) number (n: integer of 2 or greater) of output terminals to connect at most n number of the loads. The control circuit controls the driving circuit to perform an intra-channel driving mode in which one pair of the output terminals are selected from one channel and allocated to drive one load, and an inter-channel driving mode in which another pair of the output terminals are selected from two channels and allocated to drive another load.

10 Claims, 7 Drawing Sheets

| INPUT | | | | | | | OUTPUT | | | | | | | | MODE | NO |
|---|---|---|---|---|---|---|---|---|---|---|---|---|---|---|---|---|
| MOTOR SELECT | | | CH/ DCM MODE SELECT | | POLARITY | | CH1 | | | | CH2 | | | | | |
| 1 | 2 | 3 | 4 | 5 | 6 | 7 | 1 | 2 | 3 | 4 | 5 | 6 | 7 | 8 | | |
| L | L | L | – | – | – | – | – | – | – | – | – | – | – | – | STAND-BY | 1 |
| H | L | L | H | L | H | L | H | L | – | – | – | – | – | – | IM1 | 2 |
|   |   |   |   |   | L | H | L | H | – | – | – | – | – | – |   |   |
|   |   |   | L | H | H | L | – | – | – | – | H | L | – | – | IM2 OR STM3 (CH2) | 3 |
|   |   |   |   |   | L | H | – | – | – | – | L | H | – | – |   |   |
|   |   |   | H | H | L | L | L | H | – | – | L | H | – | – | IM1,IM2 | 4 |
|   |   |   |   |   | H | L | H | L | – | – | L | H | – | – |   |   |
|   |   |   |   |   | L | H | L | H | – | – | H | L | – | – |   |   |
|   |   |   |   |   | H | H | H | L | – | – | H | L | – | – |   |   |
| L | H | L | H | L | H | L | – | H | L | – | – | – | – | – | STM1 (CH1) | 5 |
|   |   |   |   |   | L | H | – | L | H | – | – | – | – | – |   |   |
|   |   |   | L | H | H | L | – | – | – | – | – | H | L | – | STM1 (CH2) | 6 |
|   |   |   |   |   | L | H | – | – | – | – | – | L | H | – |   |   |
|   |   |   | H | H | L | L | – | L | H | – | – | L | H | – | STM1 (CH1,2) | 7 |
|   |   |   |   |   | H | L | – | H | L | – | – | L | H | – |   |   |
|   |   |   |   |   | L | H | – | L | H | – | – | H | L | – |   |   |
|   |   |   |   |   | H | H | – | H | L | – | – | H | L | – |   |   |
| H | H | L | H | L | H | L | – | – | H | L | – | – | – | – | STM2 (CH1) OR STM3 (CH1) | 8 |
|   |   |   |   |   | L | H | – | – | L | H | – | – | – | – |   |   |
|   |   |   | L | H | H | L | – | – | – | – | – | – | H | L | STM2 (CH2) | 9 |
|   |   |   |   |   | L | H | – | – | – | – | – | – | L | H |   |   |
|   |   |   | H | H | L | L | – | – | L | H | – | – | L | H | STM2 (CH1,2) | 10 |
|   |   |   |   |   | H | L | – | – | H | L | – | – | L | H |   |   |
|   |   |   |   |   | L | H | – | – | L | H | – | – | H | L |   |   |
|   |   |   |   |   | H | H | – | – | H | L | – | – | H | L |   |   |
| H | L | H | H | H | L | L | – | – | L | H | L | H | – | – | STM3 (CH1,2) | 11 |
|   |   |   |   |   | H | L | – | – | H | L | L | H | – | – |   |   |
|   |   |   |   |   | L | H | – | – | L | H | H | L | – | – |   |   |
|   |   |   |   |   | H | H | – | – | H | L | H | L | – | – |   |   |

FIG. 6

| INPUT | | | | | | | OUTPUT | | | | | | | | MODE | NO |
|---|---|---|---|---|---|---|---|---|---|---|---|---|---|---|---|---|
| MOTOR SELECT | | | CH/DCM MODE SELECT | | POLARITY | | CH1 | | | CH3 | CH2 | | | CH3 | | |
| 1 | 2 | 3 | 4 | 5 | 6 | 7 | 1 | 2 | 3 | 4 | 5 | 6 | 7 | 8 | | |
| L | L | H | H | L | – | – | – | – | – | H | – | – | – | L | DCM (NORMAL) | 12 |
| | | | L | H | – | – | – | – | – | L | – | – | – | H | DCM (REVERSE) | |
| | | | H | H | – | – | – | – | – | H | – | – | – | H | DCM (BRAKE) | |
| L | H | H | H | L | L | L | – | L | H | H | – | L | H | L | DCM (NORMAL), STM1 (CH1,2) | 13 |
| | | | | | H | L | – | H | L | H | – | L | H | L | |
| | | | | | L | H | – | L | H | H | – | H | L | L | |
| | | | | | H | H | – | H | L | H | – | H | L | L | |
| | | | L | H | L | L | – | L | H | L | – | L | H | H | DCM (REVERSE), STM1 (CH1,2) |
| | | | | | H | L | – | H | L | L | – | L | H | H | |
| | | | | | L | H | – | L | H | L | – | H | L | H | |
| | | | | | H | H | – | H | L | L | – | H | L | H | |
| | | | H | H | L | L | – | L | H | H | – | L | H | H | DCM (BRAKE), STM1 (CH1,2) |
| | | | | | H | L | – | H | L | H | – | L | H | H | |
| | | | | | L | H | – | L | H | H | – | H | L | H | |
| | | | | | H | H | – | H | L | H | – | H | L | H | |
| H | H | H | H | L | H | L | H | L | H | | | | | L | DCM (NORMAL), STM1 (CH1) | 14 |
| | | | | | L | H | L | H | H | | | | | L | |
| | | | | | H | H | | | H | | H | L | | L | DCM (NORMAL), STM1 (CH2) | 15 |
| | | | | | L | L | | | H | | L | H | | L | |
| | | | L | H | H | L | H | L | L | | | | | H | DCM (REVERSE), STM1 (CH1) | 16 |
| | | | | | L | H | L | H | L | | | | | H | |
| | | | | | H | H | | | L | | H | L | | H | DCM (REVERSE), STM1 (CH2) | 17 |
| | | | | | L | L | | | L | | L | H | | H | |
| | | | H | H | H | L | H | L | H | | | | | H | DCM (BRAKE), STM1 (CH1) | 18 |
| | | | | | L | H | L | H | H | | | | | H | |
| | | | | | H | H | | | H | | H | L | | H | DCM (BRAKE), STM1 (CH2) | 19 |
| | | | | | L | L | | | H | | L | H | | H | |

MOTOR DRIVING APPARATUS

BACKGROUND OF THE INVENTION

1. Technical Field of the Invention

The present invention relates to a motor driving apparatus constituted of a driver IC which integrally comprises a driving circuit for driving a plurality of loads (coils etc.) contained in a plurality of motors built in, for example, a camera and a control circuit for controlling the driving circuit to thus drive the plurality of motors sequentially.

2. Prior Art

For example, a digital camera equipped with a plurality of motors as sources for driving a variety of working parts. These may include a stepping motor, an iris motor, and a DC motor. In particular, as for a lens-barrel, a stepping motor is used to drive a lens for, for example, auto focusing. An iris motor is used to drive a shutter and a diaphragm. In some cases, the iris motor is replaced by the stepping motor to drive a diaphragm. The DC motor is used to drive a zoom lens. In some cases, the DC motor is replaced by the stepping motor to drive the zoom lens.

The stepping motor is comprised of, for example, a multi-pole magnetized rotor, a stator, and a 2-phase coil in which two coils work as two loads. Therefore, to drive a stepping motor, the driver IC is provided with a total of four output terminals in two pairs capable of driving the two loads. Typically, each pair of the output terminals corresponds to one H-type bridge circuit, so that the driver IC comprises two H-type bridge circuits for driving one stepping motor. The iris motor is constituted of a 2-pole magnetized rotor and one coil. Therefore, to drive the iris motor, the driver IC needs to be provided with only one pair of output terminals. Furthermore, to drive the DC motor, at least one pair of output terminals is required.

In a lens-barrel for camera, as zoom-lens driving motors (zoom motors), a DC motor and a stepping motor are used typically. Occasionally, there occurs such a compensation request as auto focusing (AF) or diaphragm adjustment as interlocked with zooming, so that the zoom motor is desired to be driven as coordinated with the other motors. If, in this case, the DC motor is used for zooming, the DC motor needs to be driven simultaneously with the other motors. Therefore, the DC motor needs to be provided with a separate driving circuit independent of the other motors, thereby increasing the number of parts to be mounted, and giving rise to a problem to be solved. If the stepping motor is used for zooming, on the other hand, it can be driven sequentially with the other motors and so need not necessarily be driven simultaneously. Therefore, the stepping motor used for zooming and the other stepping motors can be driven sequentially by the common driver IC. However, if a driving circuit is provided independently for the DC motor for zooming, it cannot drive the zooming stepping motor, thereby giving rise to a problem of a poor versatility as a driver circuit IC.

SUMMARY OF THE INVENTION

In view of the above problems of the conventional technologies, it is an object of the invention to provide a motor driving apparatus that can be applied to, for example, both a DC motor and a stepping motor, using one driving circuit. It is another object of the invention to provide a motor driving apparatus having a circuit configuration that can accommodate a large variety of combinations of motors flexibly. To achieve these objects, the following means have been provided. That is, a motor driving apparatus according to one aspect of the invention comprises a driving circuit for driving a plurality of loads contained in a plurality of motors, and a control circuit for controlling the driving circuit to sequentially drive the plurality of the motors, wherein the driving circuit has at least two channels which are controlled by the control circuit concurrently with each other, each channel is controlled by the control circuit such as to selectively drive the loads, the channel is provided with at least (n+1) number (n: integer of 2 or greater) of output terminals to connect at most n number of the loads, and the control circuit controls the driving circuit to perform an intra-channel driving mode in which one pair of the output terminals are selected from one channel and allocated to drive one load, and an inter-channel driving mode in which another pair of the output terminals are selected from two channels and allocated to drive another load. The motor driving apparatus having such a configuration can be applied to controlling of a plurality of motors integrated in a lens-barrel provided with a plurality of mechanisms used in photographing by camera which are selected from a shutter mechanism, a diaphragm mechanism, an auto focusing mechanism, and a zooming mechanism.

Preferably, the driving circuit has a first channel and a second channel, and wherein an output terminal is separated from the first channel, another output terminal is separated from the second channel and the separated output channels are paired to constitute a third channel capable of driving a load under the inter-channel driving mode. For example, the driving circuit has seven input terminals connected to the control circuit, the first channel having three output terminals, the second channel having three output terminals, and the third channel having two output terminals separated from the first channel and the second channel, and the control circuit can control the driving circuit to drive a load through the third channel concurrently with driving of other loads through the first and second channels. Typically, the third channel is allocated to drive a DC motor composed of one load. In a practical form, the driving circuit is connected to drive a stepping motor simultaneously with another motor, the stepping motor being composed of two loads allocated to two channels respectively, and the control circuit can select either of the intra-channel driving mode or the inter-channel driving mode for driving said another motor. Expediently, the driving circuit can drive the stepping motor simultaneously with a DC motor as said another motor, and performs 2-phase driving of the two loads of the stepping motor through the two channels. Otherwise, the driving circuit can drive the stepping motor simultaneously with a DC motor as said another motor, and performs 1–2-phase driving of the two loads of the stepping motor through the two channels.

A motor driving apparatus according to another aspect of the invention comprises a driving circuit for driving a plurality of loads contained in a plurality of motors, and a control circuit for controlling the driving circuit to sequentially drive the plurality of the motors, wherein the driving circuit has at least two channels which are controlled by the control circuit concurrently with each other, each channel is controlled by the control circuit so as to selectively drive the loads, the channel is provided with at least (n+1) number (n: integer of 2 or greater) of output terminals to connect at most n number of loads such that two output terminals are allocated to drive one load, and the control circuit controls the driving circuit to perform either of an intra-channel driving mode in which a pair of the output terminals are selected from one channel and allocated to drive a load, and an inter-channel driving mode in which a pair of the output terminals are selected from two channels and allocated to drive a load. When the driving circuit is connected to drive a stepping motor composed of two loads sequentially with another motor, the control circuit can select either of the intra-channel driving mode and the inter-channel driving mode for driving said another motor. When the driving circuit is connected to drive a DC motor as said another motor, an output terminal is separated from one channel, another output terminal is separated from another channel and the separated output channels are paired to constitute an additional channel capable of driving the DC motor concurrently with the stepping motor under the inter-channel driving mode. The motor driving apparatus having such a configuration can be applied to controlling of a plurality of motors integrated in a lens-barrel of a camera provided with a plurality of mechanisms used in photographing which are selected from a shutter mechanism, a diaphragm mechanism, an auto focusing mechanism, and a zooming mechanism.

According to the invention, the motor driving apparatus (driver IC) is capable of selecting intra-channel driving mode as well as inter-channel driving mode of loads. By intra-channel driving mode, one pair of output terminals are allocated in one channel to drive one load. By inter-channel driving mode, one pair of output terminals are allocated over two channels to drive one load. For example, to drive a DC motor comprised of one load, inter-channel driving mode is performed. In this case, the respective output terminal allocated to the DC motor in each channel is separated from bridge connection with the remaining output terminals. Therefore, the DC motor can be driven simultaneously with the other motors such as a stepping motor.

DETAILED DESCRIPTION OF THE INVENTION

Figure 1:
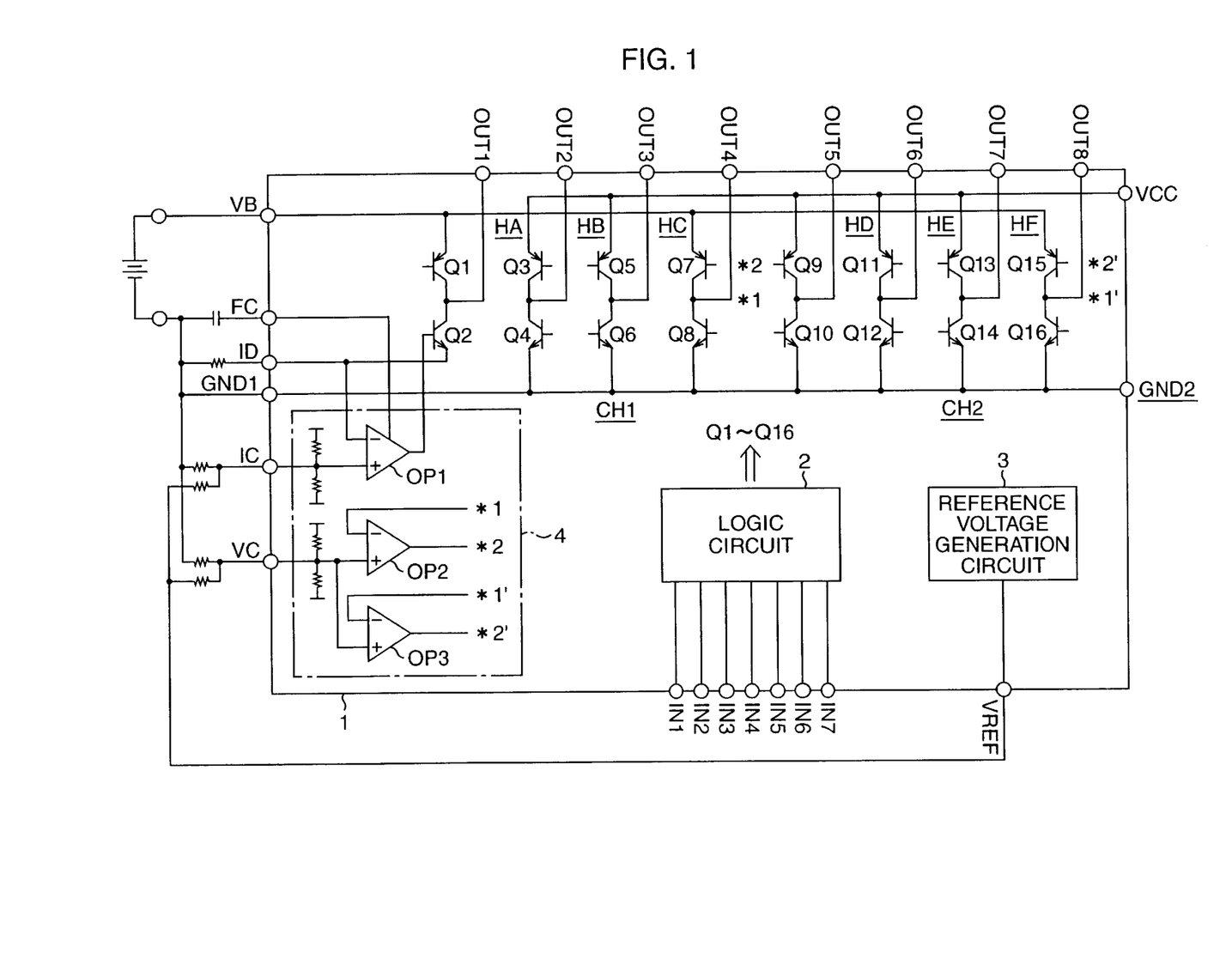
FIG. 1 is a schematic circuit diagram for showing a motor driving apparatus related to the invention.

The following will describe embodiments of the invention with reference to drawings. FIG. 1 is a schematic circuit diagram for showing a motor driving apparatus related to the invention. The present motor driving apparatus is basically composed of a driving circuit for driving a plurality of loads (not shown) contained in a plurality of motors, and a control circuit for controlling the driving circuit so as to drive the plurality of the motors according to a predetermined sequence. The driving circuit is divided into two channels of CH1 and CH2 which are controlled by the control circuit concurrently with each other. One of the channels CH1 is controlled by the control circuit in such a manner that a plurality of loads can be driven selectively. The other channel CH2 is also controlled by the control circuit in such a manner that a plurality of loads can be driven selectively. The control circuit is constituted of a logic circuit 2 shown in the figure. The channels CH1 and CH2 and the logic circuit 2 are formed integrally into a driver IC1, thereby constituting the motor driving apparatus related to the invention. It is to be noted that the driver IC1 has built-in reference voltage generation circuit 3 and constant voltage/constant current circuit 4 as well as the two channels CH1 and CH2 and the logic circuit 2. To connect these internal circuits to an outside, the driver IC1 is provided with a plurality of connection terminals. These connection terminals include output terminals OUT1–OUT8, control input terminals IN1–IN7, ground terminals GND1 and GND2, power supply terminals VB and VCC, and other terminals FC, ID, IC, VC, and VREF. The terminal VREF is provided to output therefrom a reference voltage VREF generated by the reference-voltage generation circuit 3. The terminal VC is provided to supply a referral voltage VC to the constant voltage/constant current circuit 4. The terminal IC is provided to supply a referral current to the same constant current/constant voltage circuit 4. The terminal ID is provided to supply a driving current to the constant current/constant voltage circuit 4. It is to be noted that in the constant current/constant voltage circuit 4, a constant current unit is constituted of an operational amplifier OP1 and a constant voltage unit is constituted of operational amplifiers OP2 and OP3. It is also to be noted that in the present example, the ground terminals GND1 and GND2 are connected to each other in the driver IC1.

Typically, a channel is provided with (n+1) number (n: integer of 2 or larger) of output terminals to drive n number of loads and one pair of output terminals is allocated to drive each of the loads. At least one of the pair of output terminals is commonly used by the two loads. Therefore, the control circuit controls the output terminals of each channel in such a manner that a plurality of loads may not be driven simultaneously in one channel. Stated otherwise, two loads sharing the output terminal must be driven exclusively with each other in one channel. In the present embodiment, n=3 and the channel CH1 connects three loads therein, so that it is provided with the four output terminals OUT1–OUT4, each pair of which are allocated to drive each load. For example, one load is connected between one pair of the output terminals OUT1 and OUT2. The second load can be connected between one pair of the output terminals OUT2 and OUT3. Similarly, the third load can be allocated to the output terminals OUT3 and OU4. In this configuration, at least one of the paired output terminals allocated to one load is commonly used also by the other load. For example, the OUT2 is commonly used by the first and second loads. The OUT3 is also shared by the second and third loads. In this relationship, the control circuit sequentially controls the output terminals OUT1–OUT4 of the channel 1 so that the three loads may not be driven simultaneously in the channel CH1, but must be driven sequentially. The channel CH2 also has a configuration similar to that of the channel CH1 and is actually provided with the four output terminals OUT5–OUT8.

The control circuit can control the channels CH1 and CH2 concurrently in parallel to each other. Therefore, even if two loads contained in one stepping motor are divided and allocated to the channels CH1 and CH2 respectively, the stepping motor can be driven normally similar to an ordinary driver IC.

Between one pair of the output terminals is there connected a bridge circuit. Each bridge circuit is connected between the power supply lines VCC and VB and the ground lines GND1 and GND2, to enable supplying a bi-directional current to the corresponding load in response to control by the control circuit. For example, taking notice of the channel CH1, between one pair of the output terminals OUT1 and OUT2 is there connected a bridge circuit HA constituted of four transistors Q1–Q4. This bridge circuit HA supplies a bi-directional driving current to a load in response to control of the control circuit. Then, the motor can rotate bi-directionally. Specifically, when the transistors Q1 and Q4 of the four transistors constituting the bridge circuit HA are turned ON and the transistors Q2 and Q3 are turned OFF, a normal driving current flows through the load. When the transistors Q1 and Q4 are turned OFF and the transistors Q2 and Q3 are turned ON, a reverse driving current flows through the load. Similarly, between the next pair of the output terminals OUT2 and OUT3, a bridge circuit HB constituted of the transistors Q3–Q6 is connected. It is to be noted that the transistors Q3 and Q4 are shared by the adjacent bridge circuits HA and HB. Between the further next pair of the output terminals OUT3 and OUT4 is there connected a bridge circuit HC constituted of the transistors Q5–Q8. The channel CH2 has also the same configuration as that of the channel CH1 in that between the output terminals OUT5 and OUT6 is there connected a bridge circuit HD, between the output terminals OUT6 and OUT7 is there connected a bridge circuit HE, and between the output terminals OUT7 and OUT8 is there connected a bridge circuit HF. To constitute the three bridge circuits HD, HE, and HF, the eight transistors Q9–Q16 are used in such a manner.

In response to 7-bit sequential data supplied from the input terminals IN1–IN7, the logic circuit 2 constituting the control circuit controls the driving circuit by outputting a first kind of control signal to select either one or both of the two channels of CH1 and CH2, a second kind of control signal to specify a load to be driven through the channel selected, and a third kind of control signal to specify a rotation direction of the load. Specifically, in response to the 7-bit sequential data input to the seven input terminals IN1–IN7, the logic circuit 2 outputs the first kind to third kind of control signals to thus supply a control signal (base current) which works to turn ON/OFF each of the transistors Q1–Q16 of the bridge circuits contained in the channels CH1 and CH2.

Of the plurality of bridge circuits HA–HF, the bridge circuit HA has one half side thereof placed in a constant current driving mode by the operational amplifier OP1 contained in the constant current/constant voltage circuit 4. Further, one half side of the bridge circuit HC is placed in a constant voltage driving mode by the operational amplifier OP2 contained in the constant current/constant voltage circuit 4. Similarly, one half side of the bridge circuit HF is placed in the constant voltage driving mode by an operational amplifier OP3 contained in the constant current/constant voltage circuit 4. However, the invention is not limited thereto; for example, the bridge circuits may all be placed in a switch driving mode.

The invention features that the motor driving apparatus shown in FIG. 1 can perform intra-channel driving mode that one pair of output terminals are allocated to one load in one channel and inter-channel driving mode that one pair of output terminals are selected over two channels and allocated to drive one load. The following will specifically describe this feature with reference to an example where a lens-barrel of a digital camera is driven. Driving functions utilized in the lens-barrel include shutter, diaphragm, AF, and zooming functions. An actuator type used in these driving functions is such that the shutter is comprised of an iris motor (IM) and has one load in configuration. The diaphragm function may be constituted of one or two iris motors or a stepping motor (STM). The AF function is constituted of a stepping motor in many cases. The zooming function may be comprised of a stepping motor or a DC motor (DCM). In a case where a stepping motor is used for zooming, it is necessary to drive each of two loads (coils) in normal and reverse directions. In a case where a DC motor is used for zooming, it is necessary to drive one load in the normal and reverse directions and brake the driving. Driving braking here means to control conducted so as to short-circuit two ends of the coil. FIG. 1 shows a layout of a motor driving apparatus capable of commonly driving these combined types of actuators in a minimum driving circuit configuration. As described above, the basic driving circuit comprises serially connected switch circuits provided on positive polarity and negative polarity sides of a driving power supply and four groups of switch columns having each inter-switch midpoint serving as an output terminal in such a configuration that a load is connected between each adjacent pair of output terminals to enable driving a total of three loads, which configuration is provided as many as two each for each of the channels CH1 and CH2. Since the adjacent loads are interlocked with each other in the same channel, they cannot be driven simultaneously. Further, when allocating the actuator loads to the channels CH1 and CH2, it is necessary to distribute two coils of a stepping motor to the two channels CH1 and CH2 respectively, because the stepping motor has a timing at which the two coils are energized simultaneously under 2-phase driving.

Figure 2:
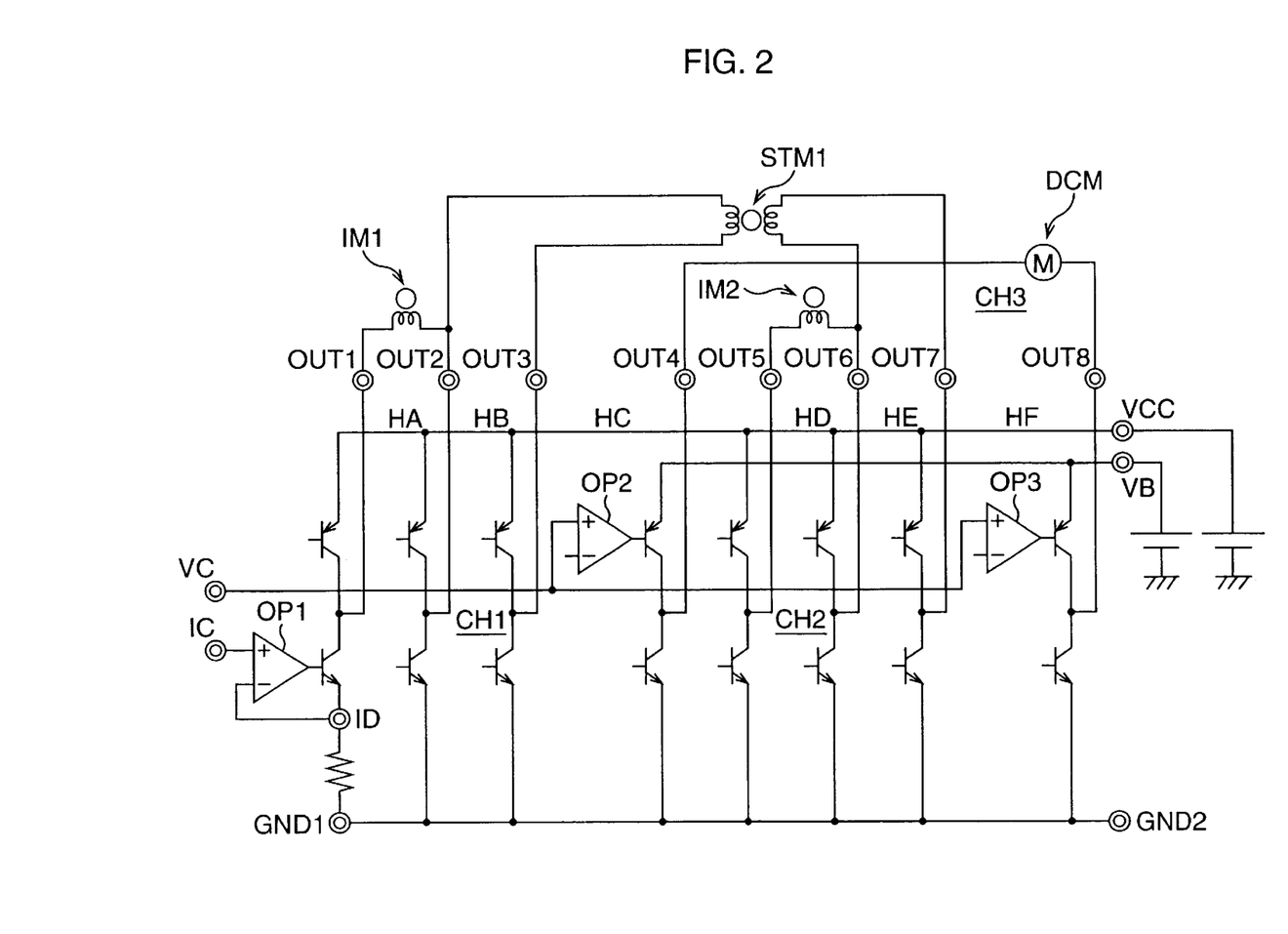
FIG. 2 is a circuit diagram for showing an example of connecting loads to the motor driving apparatus shown in FIG. 1.

FIG. 2 is a circuit diagram for showing an example of connection in which inter-channel driving mode is employed in the motor driving apparatus shown in FIG. 1 in addition to intra-channel driving mode. For easy understanding, components in FIG. 2 corresponding to those in FIG. 1 are indicated by the corresponding reference numerals. To drive the shutter, a 1-coil iris motor IM1 is connected between the pair of output terminals OUT1 and OUT2. The iris motor IM1 is driven by switching normally to open the shutter and driven by a constant current to close it. The diaphragm is driven by another 1-coil iris motor IM2. This iris motor IM2 is connected between the output terminals OUT5 and OUT6 and driven by switching normally. A 2-coil stepping motor STM1 is used for AF. One of the coil loads of the STM1 is connected between the output terminals OUT2 and OUT3 of the channel CH1 and the other coil load is connected between the output terminals OUT6 and OUT7 of the channel CH2. These coils are each driven by normal switching drive. The remaining zooming function is realized by a DC motor DCM. The DCM has one terminal thereof connected to the output terminal OUT4 of the channel CH1 and the other terminal thereof connected to the output terminal OUT8 of the channel CH2, to be driven by a constant voltage. As may be clear from the above, the loads contained in the iris motor IM1 for the shutter, the iris motor IM2 for the diaphragm, and the stepping motor STM1 for AF are all driven in the intra-channel driving mode. On the other hand, DC motor DCM for zooming is in the inter-channel driving mode. In the inter-channel driving mode, the output terminal OUT4 is released from connection with the remaining output terminals OUT1–OUT3 in the channel CH1 and so can be driven independently. Similarly, in the channel CH2, the output terminal OUT8 has also been released from connection with the remaining output terminals OUT5–OUT7 and so can be driven independently. Therefore, the DC motor DCM for zooming, if placed in the inter-channel driving mode, can be driven independently of the other loads. Accordingly, the DC motor DCM for zooming can be driven simultaneously with the iris motor IM2 or the stepping motor STM1 for AF when necessary. In such a manner, one pair of the output terminals OUT4 and OUT8 separated from the CH1 and the CH2 respectively constitute a third channel CH3. By driving the DC motor DCM by the third channel CH3, it can be driven simultaneously with the other motors.

Now, merits of placing the DC motor DCM for zooming in the inter-channel driving mode are described as follows. Optical properties of the lens-barrel give rise to a request for altering setting of the AF and diaphragm mechanisms in accordance with a degree of zooming. In a case where the stepping motor is used for zooming, it can be driven sequentially with the other stepping motors, whereas in a case where the DC motor is used for zooming, it cannot be done so. Therefore, when the DC motor is used, it needs to be driven simultaneously with the other motors. Accordingly, as shown in FIG. 2, when driving the stepping motor and the DC motor simultaneously, the DC motor is actually placed in the inter-channel driving mode so as to be released from the other loads of each channel and then can be driven simultaneously.

Further, the DC motor tolerates a large actuation current flowing therethrough owing to its properties and so has a large driving capacity. Therefore, the driving circuit needs to have a small switching loss at a large current output. If the DC motor is supposed to be in the intra-channel driving mode, any other loads that commonly use a switch side of the bridge circuit have different driving capacities between a normal directional rotation and a reverse directional rotation. Preferably, the stepping motor, for example, has a stable driving capacity in order to avoid step-out. In order to avoid such an unbalance between the normal and reverse directions, preferably the DC motor is driven commonly by the channels. Further, the driver IC needs to have a large chip area, in its structure design, in order to reserve a sufficient drive capacity. Therefore, the large-area portion should preferably extend over the channels for convenience in designing of ICs in many cases.

Figure 3:
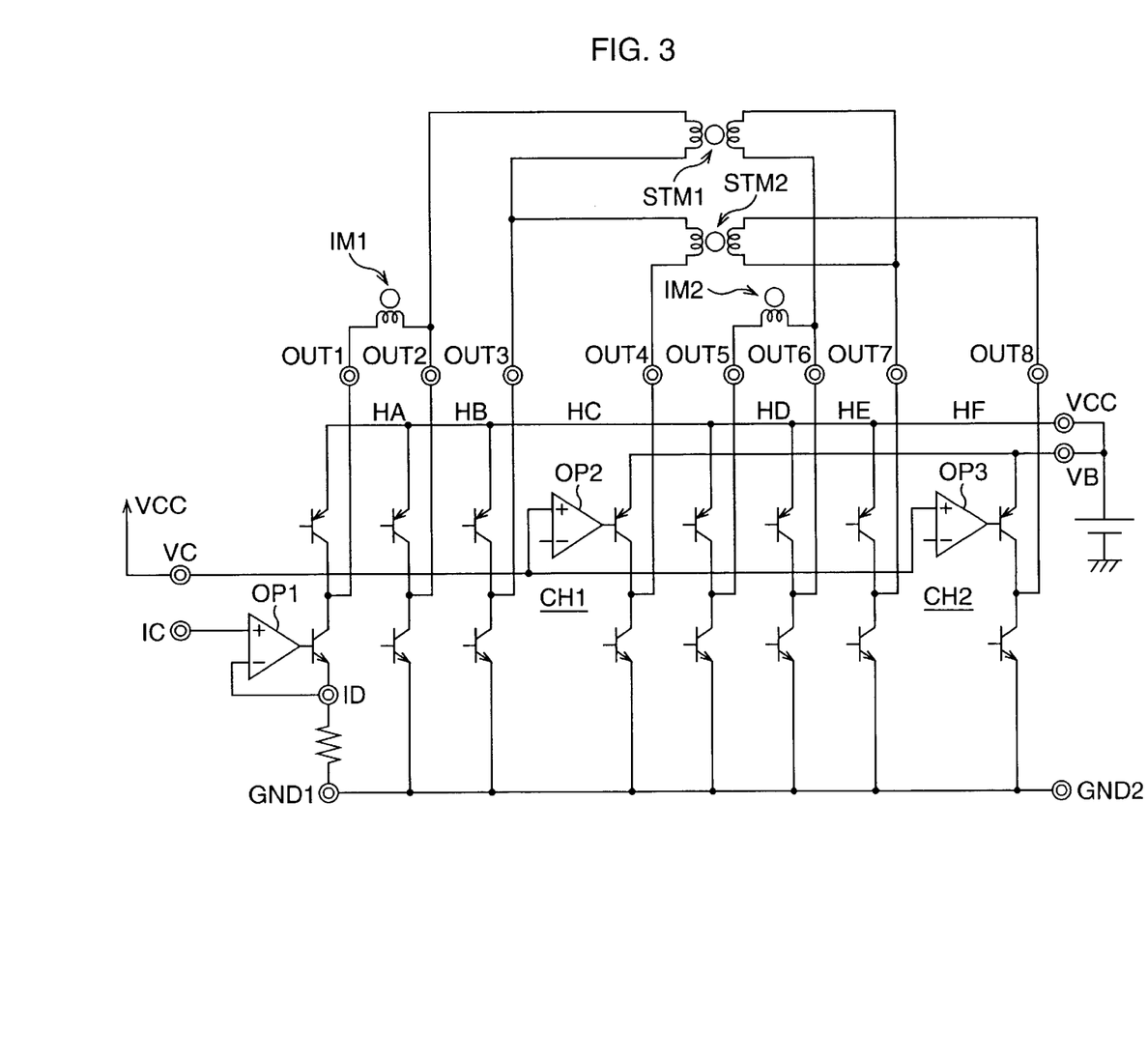
FIG. 3 is another example of connecting loads to the motor driving apparatus shown in FIG. 1.

FIG. 3 shows another example of connection of the loads to the motor driving apparatus related to the invention. For easy understanding, components in FIG. 3 corresponding to those in FIG. 2 are indicated by the corresponding reference numerals. The present example is different from the example of FIG. 2 in that a stepping motor STM2 is used in place of the DC motor DCM for zooming. The stepping motor STM2 has one coil thereof connected between the output terminals OUT3 and OUT8 of the channel CH1 and the other coil thereof connected between the output terminals OUT7 and OUT8 of the other channel CH2. In this construction, coil loads of the zooming stepping motor STM2 are both in the intra-channel driving mode, so that the stepping motor STM2 cannot be driven simultaneously with the other motors. However, the stepping motor STM2 can be driven sequentially as coordinated with the other motors STM1 and IM2 and so gives rise to no problem.

In the present example, the stepping motors STM1 and STM2 are used for AF and zooming. Therefore, each channel requires two outputs, so that remaining two outputs are allocated for the shutter and the diaphragm respectively. That is, the shutter is driven by the iris motor IM1 on the side of the channel CH1 and the diaphragm is driven by the iris motor IM2 on the side of the channel CH2. In such a manner, in the present example, a total of six loads contained in the STM1, STM2, IM1, and IM2 are driven, thus exerting a maximum capacity. In the preceding example of FIG. 2, on the other hand, a total of five loads contained in the STM1, IM1, IM2, and DCM are driven, thereby providing a configuration having an extra of one load.

Figure 4:
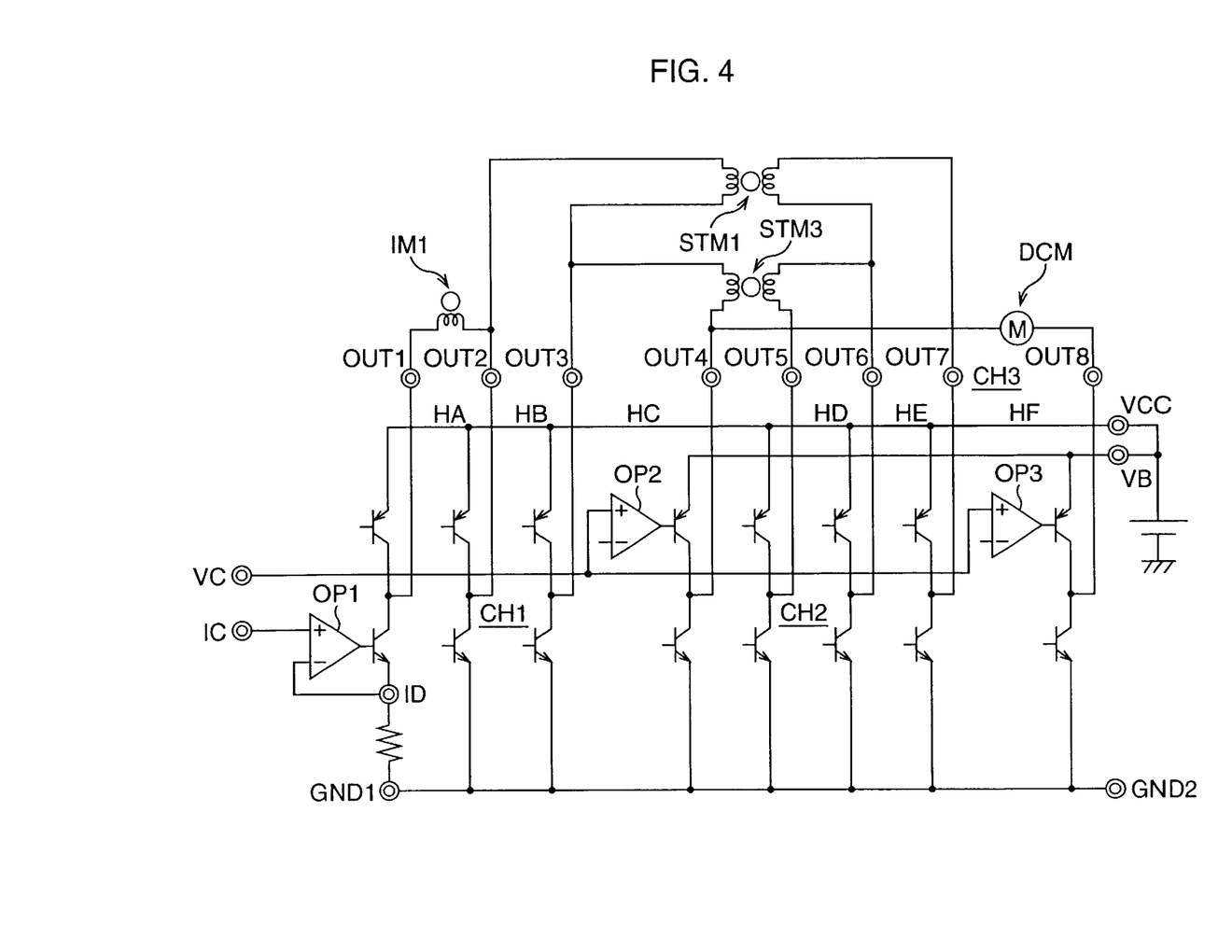
FIG. 4 is a further example of connecting loads to the motor driving apparatus shown in FIG. 1.

FIG. 4 shows a further example of connection. For easy understanding, components in FIG. 4 corresponding to those in FIG. 2 are indicated by the corresponding reference numerals. The present example is different from the example of FIG. 2 in that a stepping motor STM3 is used for zooming in place of the iris motor IM2. The stepping motor STM3 has one coil thereof connected between the output terminals OUT3 and OUT4 of the channel CH1 and the other coil thereof connected between the output terminals OUT5 and OUT6 of the channel CH2. In the present example also, a total of six loads contained in the STM1, STM3, IM1, and DCM are driven by the channel CH1 and CH2, thereby exerting a maximum capacity.

As can be seen from comparison between the example of FIG. 3 and that of FIG. 4, a predetermined group of the terminals OUT2, OU3, OUT6, and OUT7 are allocated as they are to the stepping motor STM1 for AF. In contrast, the stepping motor STM2 used in FIG. 3 is allocated the terminals OUT3, OUT4, OUT7, and OUT8, whereas the stepping motor STM3 of FIG. 4 is allocated the output terminals OUT3, OUT4, OUT5, and OUT6. In such a manner, when driving one stepping motor containing at least two loads sequentially with another motor, one of loads of the stepping motor is driven by one of the channels and the other load is driven by the other channel. In this case, in accordance with a combination with the another motor, it is made possible to appropriately change one pair of output terminals to be allocated to the stepping motor in at least one of the two channels, thereby giving a large degree of freedom in connection configuration. That is, the stepping motors STM2 and STM3 are both allocated one pair of the output terminals OUT3 and oUT4 in the channel CH1 but different from each other in allocation in the channel CH2. That is, the load of the stepping motor STM2 is connected between the OUT7 and OUT8, whereas the load of the stepping motor STM3 can be connected between the output terminals OUT5 and OUT6.

Figure 5:
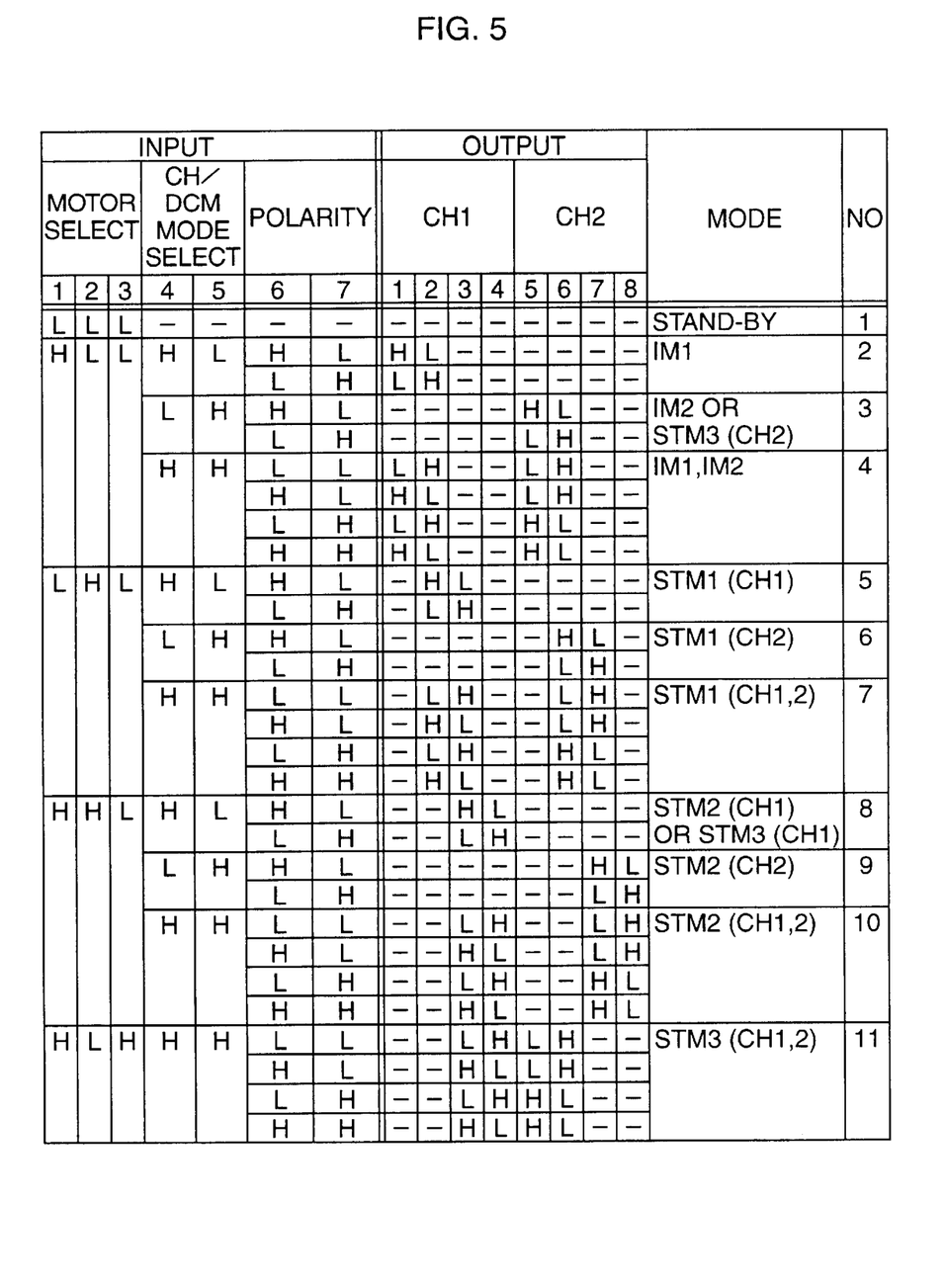
FIG. 5 is a logic table for explaining operations of the motor driving apparatus shown in FIG. 1.
Figure 6:
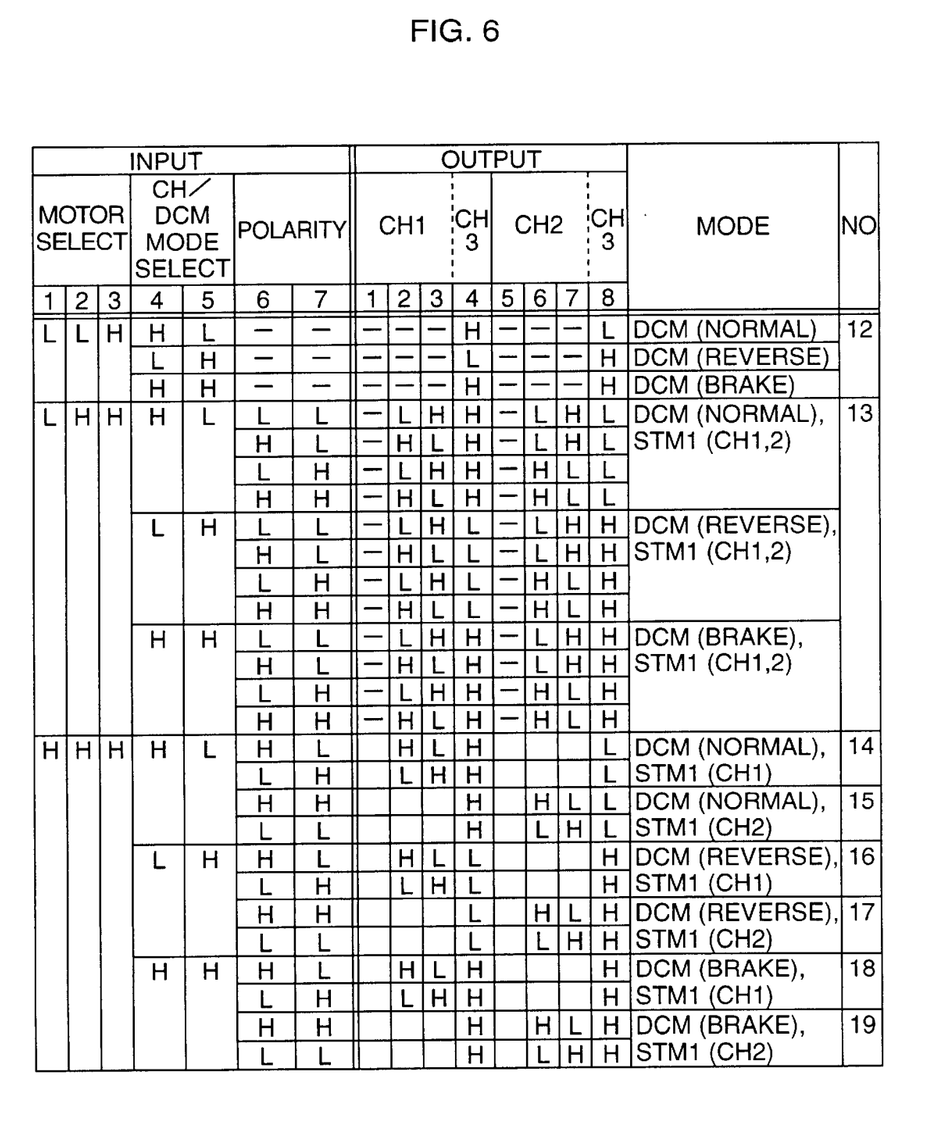
FIG. 6 is another logic table for explaining operations of the motor driving apparatus shown in FIG. 1.

FIGS. 5 and 6 show logic tables of the input/output logic circuit 2 included in the motor driving apparatus shown in FIG. 1. A left column indicates a logic level of the seven input terminals IN1–IN7 and a right column indicates a control output for the channels CH1 and CH2. As shown in them, to select a motor (Motor Select) to be driven, 3-bit data consisting of IN1, IN2, and IN3 is used. Further, to select the channels CH1, CH2 and the DCM motor (CH3), 2-bit data consisting of IN4 and IN5 is used. Further, to specify a motor energizing polarity, 2-bit data consisting of IN6 and IN7 is used. It is thus possible to sequentially control the plurality of motors containing a maximum six loads by using a 7-bit input signal.

The logic tables shown in the figures define 19 driving modes by combining the seven data bits. A mode 1 represents a standby state, in which none of the loads is energized and all of them are placed in the standby mode. A mode 2 corresponds to driving of the iris stepping motor IM1 used to drive the shutter. A mode 3 corresponds to driving of the iris motor IM2 for driving the diaphragm. It is to be noted that if the stepping motor STM3 is used in place of the iris motor IM2, the mode 3 corresponds to driving of its coil load on the side of the CH2. A mode 4 corresponds to driving of the iris motors IM1 and IM2. The modes 2, 3, and 4 can be combined to drive the iris motors IM1 and IM2 bi-directionally.

Modes 5, 6, and 7 correspond to 1–2-phase driving of the stepping motor STM1 for AF. That is, two coils of the STM1 are driven in the modes 5 and 6 alternately in 1-phase driving, and are driven simultaneously in the mode 7 in 2-phase driving. The modes 5, 6, and 7 can be combined to enable 1–2-phase driving which is a combination of the 2-phase driving and the 1-phase driving.

Similarly, modes 8, 9, and 10 can be combined to drive the zooming stepping motor STM3 in the 1–2-phase driving mode. Further, the modes 3, 8, and 11 can be combined to drive the zooming stepping motor STM3 in the 1–2-phase driving mode.

Furthermore, in a mode 12, the DC motor DCM for zooming can be driven, that is, rotated in the normal and reverse directions and braked.

Thus, by appropriately combining the modes 1–12, it is possible to accommodate any one of the connections shown in FIGS. 2–4. However, the modes 1–12 correspond to controlling in a case where the zooming DCM is not driven simultaneously with the other motors.

A mode 13 is provided to realize simultaneous driving of the DC motor DCM for zooming and the stepping motor STM1 for AF. However, the stepping motor STM1 is controlled in such a manner that the two coils thereof may always be driven simultaneously and can be operated only in, so-called, the 2-phase driving mode. The 2-phase driving mode is somewhat lacking in rotational smoothness as compared to the above-mentioned 1–2-phase driving mode.

Modes 14–19, if combined with the mode 13 described above, enable 1–2-phase driving of the stepping motor STM1 when driving the DC motor DCM and the stepping motor STM1 simultaneously. Typically, logics to be processed by a logic circuit are increased in circuit scale with an increasing number of bits of an input control signal. In view of a usage frequency, in the invention, preferably the STM is limited to 2-phase excitation when driving the DCM and the STM simultaneously. For this reason, the mode 13 is provided. That is, in the case of independent operation of the STM, the mode 1–11 are employed to enable 1–2-phase excitation of the stepping motor, whereas in the case of simultaneous driving with the DCM, it is limited to 2-phase driving in use. By thus using the modes properly, it is possible to heavily use 1–2-phase excitation while substantially suppressing an increase in number of bits of the control signal. To fully enable 1–2-phase excitation of the stepping motor in all situations, the modes 1–19 are selected. In this case, the logics scale becomes larger than that in a case where the modes 1–13 are selected. It is to be noted that in the modes 12–19, the output terminals 1, 2, and 3 correspond to the CH1, the output terminals 5, 6, and 7 correspond to the CH2, and the output terminals 4 and 8 correspond to the CH3. Here, of course, the logics must be reduced to a minimum against driving specifications.

Figure 7:
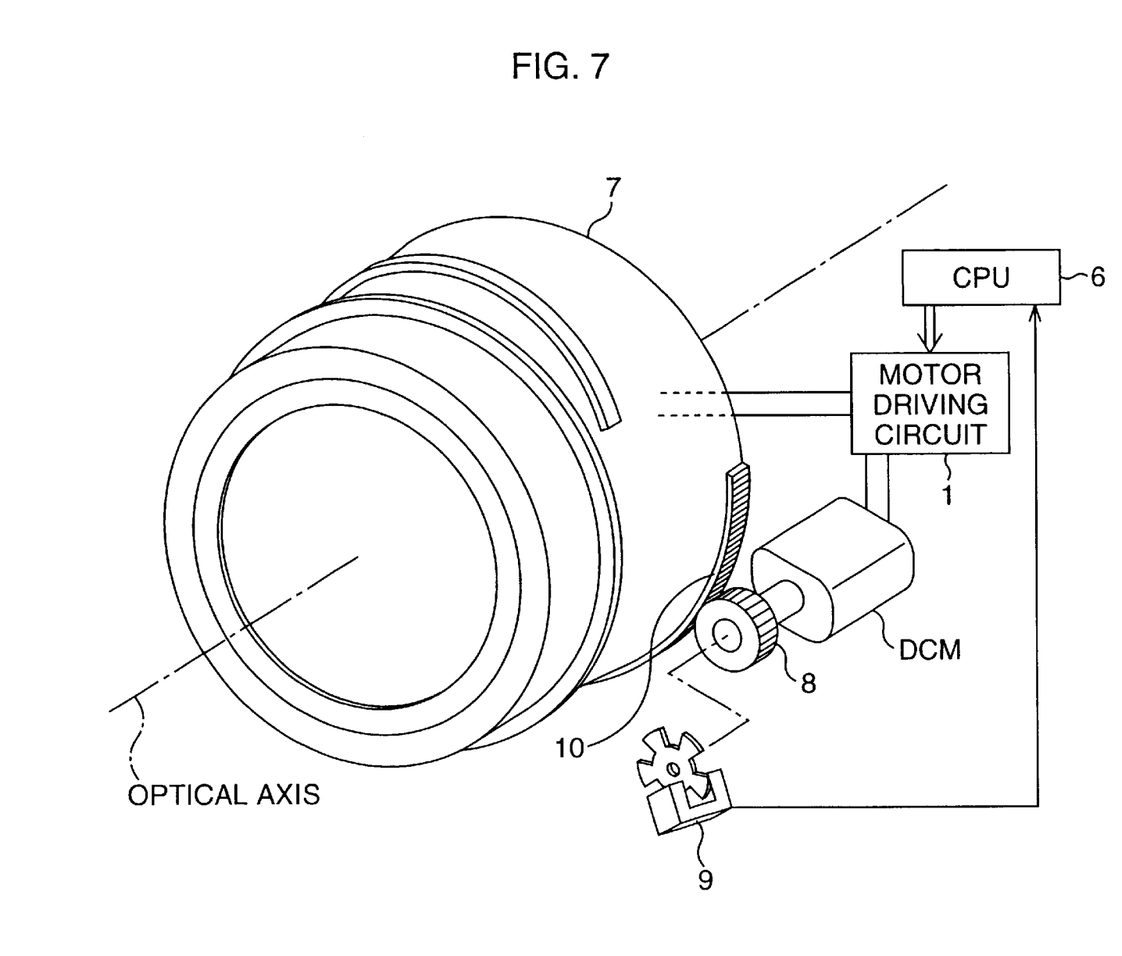
FIG. 7 is a schematic diagram for showing a lens-barrel driving apparatus for a camera according to an application of the invention.

FIG. 7 is a pattern diagram for showing a lens-barrel driving apparatus for camera according to an application of the invention. As shown in it, the lens-barrel driving apparatus for camera basically comprises a lens-barrel 7 and a motor driving circuit 1. The lens-barrel 7 is provided with a plurality of mechanisms used in photographing by camera which are selected from shutter, diaphragm, auto focusing, and zooming mechanisms and also incorporates therein a plurality of motors for driving the plurality of mechanisms. To simplify the illustration, only one of them, that is, the DC motor (DCM) for zooming is shown. The motor driving circuit 1 is a so-called driver IC and integrally comprises a driving circuit for driving a plurality of loads contained in a plurality of motors built in a camera and a control circuit for controlling the driving circuit to thus drive the plurality of motors sequentially.

According to the zooming mechanism shown in the figure, the lens-barrel 7 is incorporated in the camera in such a manner as to advance and retreat along an optical axis. On an outer periphery of the lens-barrel 7 is there formed a rack 10. A pinion 8 is mounted on a shaft of the DCM in such a manner as to mesh with the rack. The motor driving circuit 1 drives the DCM under the control of a camera controlling CPU6, to move the lens-barrel 7 along the optical axis. An encoder 9 detects the number of rotations of the shaft of the DCM and inputs it into the CPU6. The CPU6, based on an output from the encoder 9, controls the motor driving circuit 1, thus performing desired zooming. Although not shown, other motors driving the shutter, diaphragm, auto focusing mechanisms, etc. are similarly driven by the driver IC1 and controlled by the CPU6.

Driving functions utilized by the lens-barrel 7 typically include shutter, diaphragm, auto focusing (AF), and zooming functions. As for a type of an actuator used to drive these, for example, an iris motor (IM) is used to drive the shutter and constituted of one load. The diaphragm is driven by one or two iris motors or by a stepping motor (STM). To drive the AF function, a stepping motor is used often. The zooming function is driven by either a stepping motor or a DC motor (DCM) as shown in the figure. When using a stepping motor for zooming, it is necessary to drive each of two loads (coils) thereof in normal and reverse directions. When using a DC motor for zooming, on the other hand, one load thereof needs to be driven in the normal and reverse directions and braked in driving. Driving braking here means to conduct control so as to short-circuit two ends of the coil. The driver IC (motor driving apparatus 1) is a motor driving apparatus that can commonly drive the above-mentioned combinations of the actuators in a minimum driving circuit configuration and has such a layout as shown in, for example, FIG. 1.

As described above, according to the invention, for example, when using a DC motor, the inter-channel driving mode is employed to thus isolate the DC motor from the other loads in each channel, thereby enabling driving the DC motor simultaneously with the other motors allocated to each channel. Further, when using a stepping motor instead of a DC motor, it is possible to distribute two coil loads of the stepping motor over the channels. It is thus possible to use a DC motor and a stepping motor properly in one-motor driving circuit configuration and also to drive the DC motor simultaneously with the other motors. Furthermore, by allocating different output terminals to the coils of a stepping motor in the channels, it is possible to assign the stepping motor for diaphragm adjustment while using a DC motor for zooming. In such a manner, the invention can accommodate a large variety of motor load combinations flexibly, thereby providing a versatile motor driving apparatus.

What is claimed is:

1. A motor driving apparatus comprising:
   a driving circuit for driving a plurality of loads contained in a plurality of motors; and
   a control circuit for controlling the driving circuit to sequentially drive the plurality of the motors, wherein:
   the driving circuit has at least two channels which are controlled by the control circuit concurrently with each other;

each channel is controlled by the control circuit such as to selectively drive the loads;

the channel is provided with at least (n+1) number (n: integer of 2 or greater) of output terminals to connect at most n number of the loads; and the control circuit controls the driving circuit to perform an intra-channel driving mode in which one pair of the output terminals are selected from one channel and allocated to drive one load, and an inter-channel driving mode in which another pair of the output terminals are selected from two channels and allocated to drive another load.

2. The motor driving apparatus according to claim 1, wherein the driving circuit has a first channel and a second channel, and wherein an output terminal is separated from the first channel, another output terminal is separated from the second channel and the separated output channels are paired to constitute a third channel capable of driving a load under the inter-channel driving mode.

3. The motor driving apparatus according to claim 2, wherein the driving circuit has seven input terminals connected to the control circuit, the first channel having three output terminals, the second channel having three output terminals, and the third channel having two output terminals separated from the first channel and the second channel, and wherein the control circuit can control the driving circuit to drive a load through the third channel concurrently with driving of other loads through the first and second channels.

4. The motor driving apparatus according to claim 2, wherein the third channel is allocated to drive a DC motor composed of one load.

5. The motor driving apparatus according to claim 1, wherein the driving circuit is connected to drive a stepping motor simultaneously with another motor, the stepping motor being composed of two loads allocated to two channels respectively, and wherein the control circuit can select either of the intra-channel driving mode or the inter-channel driving mode for driving said another motor.

6. The motor driving apparatus according to claim 5, wherein the driving circuit can drive the stepping motor simultaneously with a DC motor as said another motor, and performs 2-phase driving of the two loads of the stepping motor through the two channels.

7. The motor driving apparatus according to claim 5, wherein the driving circuit can drive the stepping motor simultaneously with a DC motor as said another motor, and performs 1–2-phase driving of the two loads of the stepping motor through the two channels.

8. A motor driving apparatus comprising:

a driving circuit for driving a plurality of loads contained in a plurality of motors; and a control circuit for controlling the driving circuit to sequentially drive the plurality of the motors, wherein:

the driving circuit has at least two channels which are controlled by the control circuit concurrently with each other;

each channel is controlled by the control circuit so as to selectively drive the loads;

the channel is provided with at least (n+1) number (n: integer of 2 or greater) of output terminals to connect at most n number of loads such that two output terminals are allocated to drive one load; and the control circuit controls the driving circuit to perform either of an intra-channel driving mode in which a pair of the output terminals are selected from one channel and allocated to drive a load, and an inter-channel driving mode in which a pair of the output terminals are selected from two channels and allocated to drive a load, wherein when the driving circuit is connected to drive a stepping motor composed of two loads sequentially with another motor, the control circuit can select either of the intra-channel driving mode and the inter-channel driving mode for driving said another motor, and wherein when the driving circuit is connected to drive a DC motor as said another motor, an output terminal is separated from one channel, another output terminal is separated from another channel and the separated output channels are paired to constitute an additional channel capable of driving the DC motor concurrently with the stepping motor under the inter-channel driving mode.

9. A lens-barrel driving apparatus for a camera comprising:

a lens-barrel provided with a plurality of mechanisms for photographing by the camera, the mechanisms being selected from the group consisting of a shutter mechanism, a diaphragm mechanism, an auto focusing mechanism and a zooming mechanism;

a plurality of motors which are integrated in the camera so as to actuate the plurality of the mechanisms;

a driving circuit for driving a plurality of loads contained in the plurality of the motors; and a control circuit for controlling the driving circuit to sequentially drive the plurality of the motors, wherein:

the driving circuit has at least two channels which are controlled by the control circuit concurrently with each other;

each channel is controlled by the control circuit such as to selectively drive the loads;

the channel is provided with at least (n+1) number (n: integer of 2 or greater) of output terminals to connect at most n number of the loads; and the control circuit controls the driving circuit to perform an intra-channel driving mode in which one pair of the output terminals are selected from one channel and allocated to drive one load, and an inter-channel driving mode in which another pair of the output terminals are selected from two channels and allocated to drive another load.

10. A lens-barrel driving apparatus for a camera comprising:

a lens-barrel provided with a plurality of mechanisms for photographing by the camera, the mechanisms being selected from the group consisting of a shutter mechanism, a diaphragm mechanism, an auto focusing mechanism and a zooming mechanism;

a plurality of motors which are integrated in the camera so as to actuate the plurality of the mechanisms;

a driving circuit for driving a plurality of loads contained in the plurality of the motors; and a control circuit for controlling the driving circuit to sequentially drive the plurality of the motors, wherein:

the driving circuit has at least two channels which are controlled by the control circuit concurrently with each other;

each channel is controlled by the control circuit so as to selectively drive the loads;

the channel is provided with at least (n+1) number (n: integer of 2 or greater) of output terminals to connect at most n number of loads such that two output terminals are allocated to drive one load; and the control circuit controls the driving circuit to perform either of an intra-channel driving mode in which a pair of the output terminals are selected from one channel and allocated to drive a load, and an inter-channel driving mode in which a pair of the output terminals are selected from two channels and allocated to drive a load, wherein when the driving circuit is connected to drive a stepping motor composed of two loads sequentially with another motor, the control circuit can select either of the intra-channel driving mode and the inter-channel driving mode for driving said another motor, and wherein when the driving circuit is connected to drive a DC motor as said another motor, an output terminal is separated from one channel, another output terminal is separated from another channel and the separated output channels are paired to constitute an additional channel capable of driving the DC motor concurrently with the stepping motor under the inter-channel driving mode.

* * * * *